United States Patent [19]

Bantle

[11] Patent Number: 4,860,208

[45] Date of Patent: Aug. 22, 1989

[54] ARRANGEMENT FOR THE CONTROL OF THE POWER TRANSMISSION OF A FOUR-WHEEL DRIVE VEHICLE

[75] Inventor: Manfred Bantle, Vaihingen/Enz, Fed. Rep. of Germany

[73] Assignee: Dr. Ing. h.c.F. Porsche Aktiengesellschaft, Stuttgart, Fed. Rep. of Germany

[21] Appl. No.: 188,429

[22] Filed: Apr. 29, 1988

[30] Foreign Application Priority Data

Apr. 29, 1987 [DE] Fed. Rep. of Germany ....... 3714330

[51] Int. Cl.$^4$ ..................... B60K 17/34; B60K 23/08; B60K 41/18
[52] U.S. Cl. ................. 364/424.1; 180/248; 180/249
[58] Field of Search .................. 180/241, 244–248, 180/251; 364/424.1; 192/103 F

[56] References Cited

U.S. PATENT DOCUMENTS

| | | | |
|---|---|---|---|
| 4,538,700 | 9/1985 | Suzuki | 180/248 |
| 4,566,554 | 1/1986 | Suzuki | 180/247 |
| 4,586,583 | 5/1986 | Yamakawa et al. | 180/247 |
| 4,690,238 | 9/1987 | von Sivers et al. | 180/248 |
| 4,711,317 | 12/1987 | Sakakiyama | 180/247 |
| 4,714,129 | 12/1987 | Mueller | 180/248 |
| 4,754,835 | 7/1988 | Stelter et al. | 180/248 |
| 4,757,728 | 7/1988 | Pitsch | 180/248 |
| 4,757,870 | 7/1988 | Torii et al. | 180/247 |
| 4,776,424 | 10/1988 | Naito | 180/247 |

FOREIGN PATENT DOCUMENTS

| | | |
|---|---|---|
| 3437435 | 8/1986 | Fed. Rep. of Germany. |
| 3437436 | 8/1986 | Fed. Rep. of Germany. |
| 3631180 | 4/1987 | Fed. Rep. of Germany. |

OTHER PUBLICATIONS

"Der Porsche Typ 959–Gruppe B–" Atz Automobiltechnische Zeitschrift 88 (1986) pp. 353–356.

Primary Examiner—Parshotam S. Lall
Assistant Examiner—Christopher L. Makay
Attorney, Agent, or Firm—Barnes & Thornburg

[57] ABSTRACT

For improving the load-change behavior of a four-wheel drive motor vehicle when driving through curves, the vehicle is provided with a longitudinal clutch continuously controllable and with a lockable differential continuously controllable in its locking action. The activation of the longitudinal clutch takes place in the first instance in dependence on velocity whereas the activation of the lockable differential is undertaken in the first instance in two stages dependent on power output whereby a velocity-dependent characteristic can additionally be super-imposed on this power output dependent control.

22 Claims, 3 Drawing Sheets

ARRANGEMENT FOR THE CONTROL OF THE POWER TRANSMISSION OF A FOUR-WHEEL DRIVE VEHICLE

BACKGROUND AND SUMMARY OF THE INVENTION

The present invention relates to an arrangement for the control of the power transmission of a four-wheel drive motor vehicle with a main drive axle provided with a cross differential and with an auxiliary drive axle driven by way of a longitudinal clutch continuously controllable by means of an adjusting member, and in which a control unit receives input signals from transmitters or pick-ups detecting the velocity of the wheels at the auxiliary drive axle.

According to the German patent application P 36 08 059.4, corresponding to U.S. Pat. application 07/024,068 filed Mar. 10, 1987, an arrangement for the control of the power transmission of a four-wheel drive vehicle is provided which achieves with a relatively small number of sensor-detected operating and driving parameters and with low technical control expenditures that the traction-conditioned advantages of the four-wheel drive can be combined with the advantages of the driving behavior of a two-wheel drive without having to accept the respective disadvantages thereof. Such a vehicle is described in the article by H. Bott and M. Bantle, "Der Porsche Typ 959 - Gruppe B - ein besonderes Automobil" ["The Porsche Type 959 - Group B - A Special Automobile"], Part 2, ATZ 88 (1986), Volume 6, pages 353 to 356.

This is achieved primarily in that a traction force proportion Fzf of the wheels at the auxiliary drive axle is determined by way of an amount of a desired traction force Fzs multiplied by a distribution factor; the same is determined from a desired power output Ps (selected by the driver) and by a vehicle velocity vf. The distribution factor is thereby determined from a traction force excess which is calculated from the difference of the desired traction force Fzs and the driving resistance Fv of the vehicle.

It is the object of the present invention to provide an arrangement for the control of the power transmission to the wheels of a four-wheel drive vehicle which refines the driving-dynamic overall-behavior of a motor vehicle attainable with the arrangement according to the P 36 08 059.4-12 and which in particular further improves the load change behavior during curve drives and the longitudinal stability of the vehicle.

The underlying problems are solved according to the present invention in that the control unit produces a control magnitude for the adjusting member of the longitudinal clutch in such a manner that it is in a functional relationship with at least one activating magnitude which is determined from the vehicle velocity determined from the velocity of the wheels at the auxiliary drive axle, whereby within a first low velocity range (0 smaller than or equal to vf smaller than or equal to vfb), the activation is cancelled and within a second higher velocity range (vfa smaller than vf smaller than or equal to vfb), the activating magnitude is raised from beginning with an increasing velocity to a control magnitude value and remains at this control magnitude value above the second velocity range (vf greater than vfb).

The advantages of the present invention reside in the first instance in that the driving-dynamic overall-behavior of a motor vehicle is further improved because the arrangement reacts better to internal (for example, load-change) and external (for example, abruptly changing friction value conditions in the wheel-/road surface-contact) interference magnitudes, stabilizes the vehicle especially when driving through curves and altogether acts in a quieting manner on the overall driving behavior and improves the longitudinal and cross-stability.

This was achieved in the first instance in that a continuously controllable longitudinal clutch of a four-wheel drive motor vehicle is activated with a characteristic dependent on velocity. The activation is thereby suppressed in a low velocity range, is raised in a higher velocity range with increasing velocity starting from 0 to a control magnitude value and is kept constant above this higher velocity range. Velocity ranges and control magnitude values are additionally variable in the control unit by input of an adjusting magnitude (driving program).

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
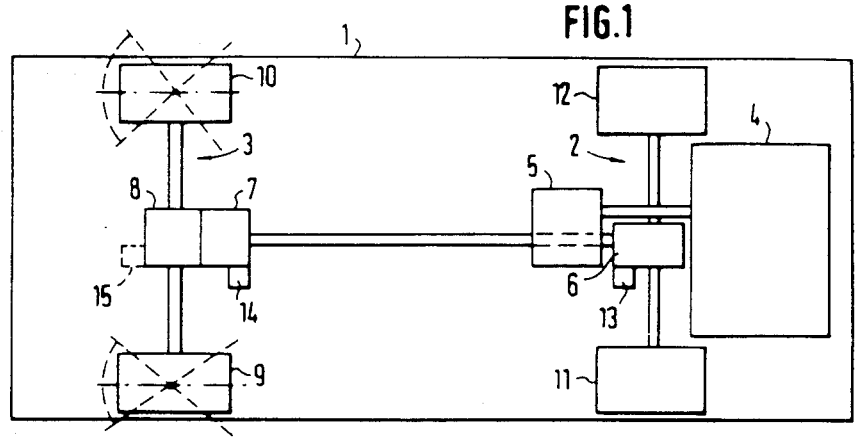
FIG. 1 is a schematic view of a drive unit of a motor vehicle in accordance with the present invention.

Referring now to the drawing wherein like reference numerals are used throughout the various views to designate like parts, and more particularly to FIG. 1, a four-wheel drive motor vehicle is designated in this figure by reference numeral 1 which includes a main drive axle 2 (rear axle) and an auxiliary drive axle 3 (front axle); an internal combustion engine 4 is arranged, for example, within the area of the main drive axle 2, in this case within the rear area of the motor vehicle 1, which drives by way of a clutch-transmission unit 5 a cross differential 6 of the main drive axle 2 continuously controllable in its locking action and additionally a differential 8 of the auxiliary drive axle 3 by way of a continuously controllable longitudinal clutch 7. In a simple realization the differential 8 is constructed as customary differential gear; however, it can also be a self-locking differential gear or a differential gear continuously controllable in its locking moment. The wheels 9 and 10 at the auxiliary drive axle 3 are constructed steerable whereas the wheels 11 and 12 of the main drive axle 2 are not steerable. Adjusting members 13 and 14 for the actuation of a locking device of the cross differential 6 and of the longitudinal clutch 7 are merely symbolically indicated, as also an adjusting member 15 indicated in dash line of a blocking device of the differential of the auxiliary driving axle 3 which is required only in the case of a differential continuously controllable in its blocking moment; the adjusting members can be flangedly connected to the aggregates, partially or completely integrated into the same or arranged at least partially outside the same and connected with the same mechanically, hydraulically, pneumatically or electrically.

Figure 2:
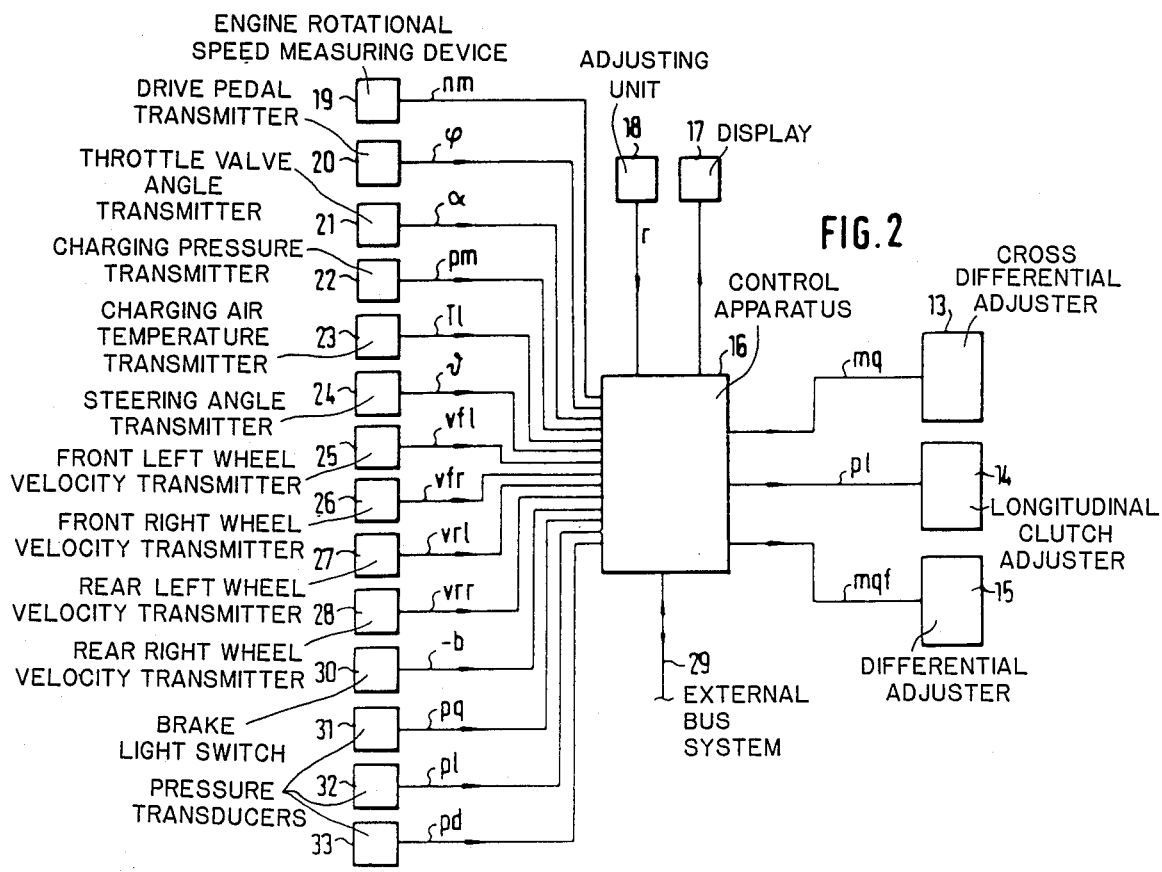
FIG. 2 is a schematic block diagram of a control apparatus with input and output magnitudes according to the present invention.

The control apparatus 16 with its input and output magnitudes, illustrated in FIG. 2, represents a maximum configuration in which, in addition to the adjusting member 14 of the longitudinal clutch 7, also the adjusting member 13 of the cross differential 6 and the adjusting member 15 of the differential 8 are additionally activated. Also, only a certain number of the inter-connected sensors already suffices for a good functioning of the arrangement.

It is thereby assumed that the adjusting members act linearly and are provided eventually with subordinate control circuits. Of course, the control circuits may also be implemented in the control apparatus 16. Eventual feedbacks of measured values are thereby not shown. Anyhow, the connections between function blocks which are shown in the drawings are to be considered rather as action lines.

The control apparatus 16 is thereby preferably constructed on the basis of a microcomputer system, for example, a type 8051 of Intel (single-chip microcomputer). The construction of the control apparatus corresponds to a customary process computer configuration with central unit, volatile and non-volatile memories (RAM and ROM), input and output components, time clocks, etc.; consequently, the construction thereof is not explained in detail.

A display 17 is further connected with the control apparatus 16, which is arranged in the instrument panel of the motor vehicle and indicates to the driver informations concerning an instantaneous condition of the arrangement, for example, which differential locking device is actuated to what percentage and with what percentage rate the longitudinal clutch distributes the driving moment to the front axle; possible errors or failures in the arrangement may also be indicated on the display 17.

An adjusting unit 18 producing an adjusting magnitude r permits a deliberate influencing of the control behavior which can be undertaken partly by the driver and partly only by a service personnel. It is to be made possible, for example, to the driver to select certain control methods as a function of a road condition; with a vehicle stuck in snow or on loose ground, it may be appropriate, for example, to adjust a rigid through-drive to the auxiliary drive axle and possibly a complete locking of the differentials. An eventual sensor-detection of a friction value between wheels and a road surface may also be coordinated to the adjusting unit 18.

The word "sensor-detected" is not to be necessarily understood only in the sense of an eventual sole detection of a measured magnitude or in a conversion of the measured magnitude into another physical magnitude, it can also mean a processing or pre-processing of one or several detected magnitudes.

For the calculation of an—internally required—desired power output Ps, the control apparatus 16 receives from an engine rotational speed measuring device 19 an engine rotational speed signal nm and either a drive pedal signal phi from a drive pedal transmitter 20 or a throttle valve angle signal alpha from a throttle valve angle transmitter 21 and in case of a supercharged internal combustion engine from a charging pressure transmitter 22 a charging pressure signal pm and from a charging air temperature transmitter 23 a charging air temperature signal Tl.

A detection of a steering deflection by a steering angle transmitter 24 is not provided in the base version according to the invention because the control apparatus also assures an excellent driving behavior without a steering deflection signal; it is only required for achieving an ultimate refinement and is therefore only mentioned for the sake of completeness.

The control unit receives from the transmitters 25 and 26 coordinated to the wheels 9 and 10 as well as from the transmitters 27 and 28 coordinated to the wheels 11 and 12 signals vfl, vfr, vrl and vrr which correspond to the velocities of these wheels at the auxiliary and main drive axles 3 and 2.

These signals are also required for a control apparatus of an anti-blocking brake system (ABS) so that their signal detection in vehicles which are equipped with such a system, can also take place in common, i.e., they are detected by one of the two systems and made available to the other.

An external bus system 29 is provided in the control apparatus 16, by way of which the control apparatus can communicate with other digital computer systems installed in the vehicle for control-, measuring- and information-purposes, for example, with a control apparatus of an ABS or with an engine management computer (digital engine electronics). In that case these digital computer systems can supply to the control apparatus already prepared signals (for example, desired power output Ps, wheel rotational speeds vfl, vfr, vrl, vrr) so that the sensors 19 to 23 and 25 to 28 can be dispensed with.

A delay signal −b can be supplied to the system from the control apparatus of an ABS or of a brake light switch 30 whereupon the control apparatus 16 in a vehicle that is equipped with an ABS, so far de-activates at least the adjusting member 14 of the longitudinal clutch 7 that the ABS can safely detect an occurring brake slippage and can regulatingly act into the metering of the braking force.

In vehicles without ABS, it may also be meaningful to fully activate the adjusting members 13 to 15 during the braking in order to avoid an overbraking of individual wheels or axles.

Furthermore, pressure transducers 31, 32 and 33 may be connected to the control apparatus 16 which produce signals corresponding to the control pressures pq, pl, pd at the output of the adjusting members 13 to 15 for regulating-, monitoring-or indicating-purposes.

Figure 3:
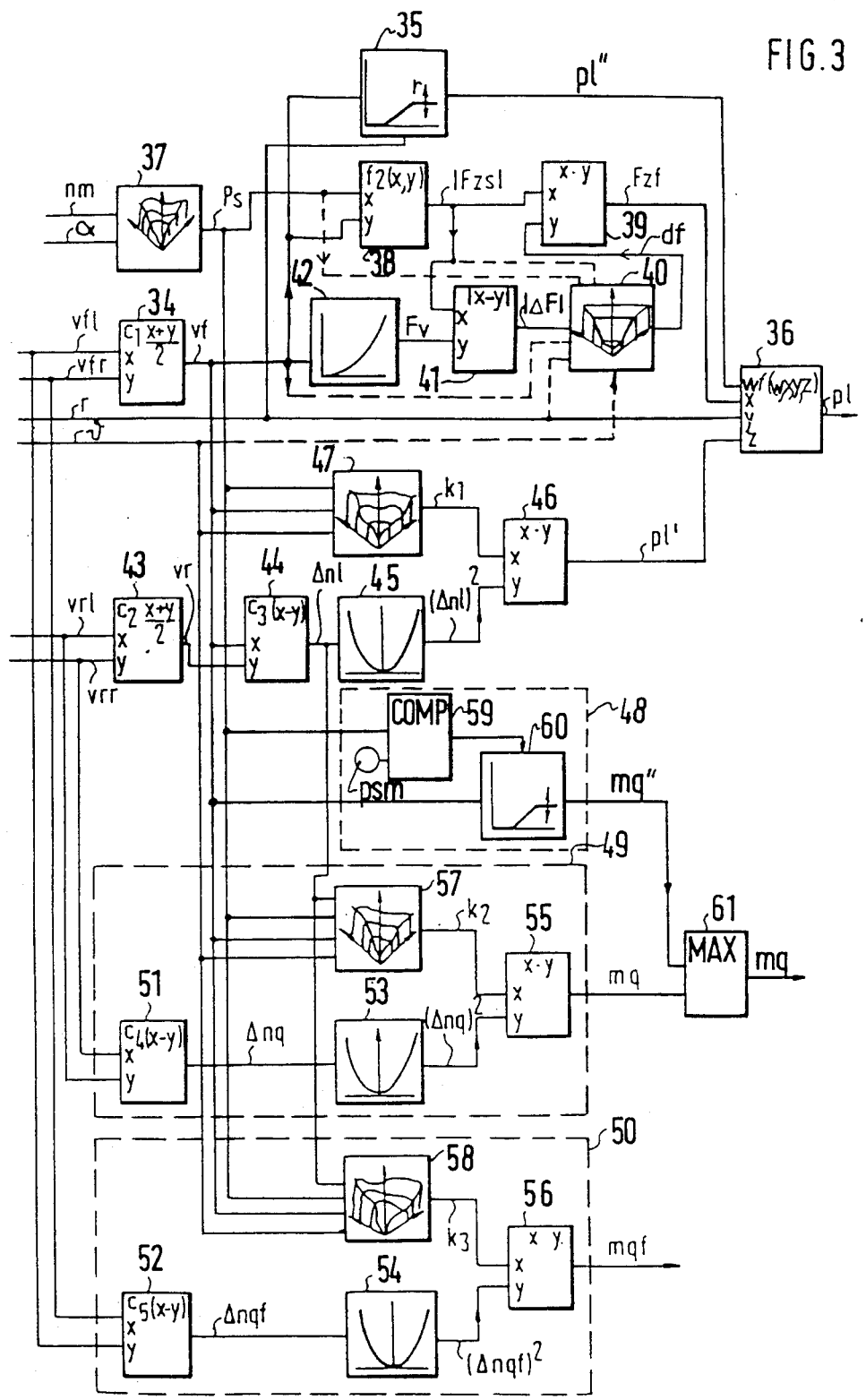
FIG. 3 is a block diagram of a control method implemented in a control apparatus in accordance with the present invention for the control of a longitudinal clutch.

The block diagram shown in FIG. 3 illustrates a control method for the activation of the longitudinal clutch 7. A velocity vf (vehicle velocity) of the wheels at the auxiliary drive axle, corresponding to the driving velocity, is determined from the wheel velocity signals vfl and vfr by way of an average value formation 34 weighted with a constant $c_1$. A value of an activating magnitude pl" is coordinated by way of a performance graph (set of characteristic curves) 35 to a respective value of the velocity of the wheels at the auxiliary drive axle (hereinafter referred to as vehicle velocity). The characteristic curve on which this coordination is based, is thereby determined by the adjusting magnitude r (selected by the driver). In its base form, the characteristic curves coordinate to the velocity an activating magnitude pl'' which is equal to zero for small velocities, at first linearly increases for higher velocities and is constant for still higher velocities. These characteristic curves will be explained hereinafter by reference to FIG. 4.

The activating magnitude pl'' is converted by way of a first functional relationship $f_1$ (Fzf, r, pl', pl''), 36 into a control magnitude pl for the activation of the adjusting member 14 of the longitudinal clutch 7. The first functional relationship can additionally depend from further magnitudes Fzf, r, pl', for example, from the adjusting magnitude r. In the most simple case, the first functional relationship ($f_1$ (Fzf, r, pl', pl'')), 36 consists of a constant translation of one of its input magnitudes into the output magnitude (control magnitude) pl, however it may also be a weighted addition of the input magnitudes or a weighted maximum value selection therefrom.

The further input magnitudes of the first functional relationship will be explained as follows:

A desired power output Ps determined by the driver is determined at an instantaneous engine rotational speed nm by way of a throttle valve angle-rotational speed-performance graph 37 from the engine rotational speed signal nm and the throttle valve angle alpha or the drive pedal signal phi. In engines which are equipped, for example, with turbochargers, a charging pressure- and a charging air temperature temperature-signal pm and Tl are additionally fed to the performance graph 37. In the case of a motor vehicle equipped with digital engine electronics for the control of ignition and injection, as a rule already a signal corresponding to the value of the desired power output |Ps| can be taken therefrom.

A value of a desired traction force |Fzs| is determined from the vehicle velocity vf and from the desired power output Ps or the value thereof by way of a second functional relationship $f_2$(Ps, vf) 38, which is explained in detail in FIG. 8 of the DE-OS 36 08 059.4-12 by reference to a diagram. This value is linked by way of a multiplication 39 with a distribution factor df into a traction force Fzf of the auxiliary drive axle, and is converted by way of the first functional relationship $f_1$(Fzf, r, pl', pl''), 36 into the control magnitude pl for the activation of the adjusting member 14 of the longitudinal clutch.

The distribution factor df is obtained by way of a performance graph (set of characteristic curves) 40 from an amount of a tractional force excess DELTA F. The latter is determined by means of a difference- and value formation 41 from the value of the desired traction force |Fzs| and a driving resistance force Fv whereby the latter is determined from the vehicle velocity vf by way of a drive resistance characteristic curve 42.

The distribution factor df can further be determined by way of the first performance graph 40, in addition to be determined from the amount of the traction force excess |DELTA F|, also from the value of the desired traction force |Fzs|, from the desired power output Ps and the velocity vf, the control magnitude r or any suitable combination of these control magnitudes. It should be noted marginally that the term "performance graph" is to be viewed as generic term for a digitalized functional relationship stored in a memory area (i.e., detected at data samples), which in the most simple case is a constant but may further include a characteristic curve or a characteristic curve variable by one or several parameters or even a multi-dimensional performance graph dependent on several characteristic magnitudes whereby with values between the data samples one has recourse to quantizing or interpolation.

The following should be mentioned: in the case of an amount of the desired tension force |Fzs| multiplied with a constant value df, the arrangement forms a distribution transmission with a fixed distribution of the driving torque to the driven axles (simulation of a mechanical distribution transmission by an electromechanical arrangement with controllable clutch).

If the distribution factor df is determined by way of the first performance graph 40 solely from one independent variable, —the amount of the tension force excess |DELTA F| or the desired traction force |Fzs| —then a characteristic curve which is either constant or (linearly) decreasing will prove favorable.

With the use of the desired power output Ps and the velocity vf as input magnitudes, a performance graph will prove favorable which for small values of the magnitudes of Ps and vf, has initially a constant value of the distribution factor df, i.e. a maximum value dfmax, for higher values of Ps and vf has a value of the distribution factor df corresponding to a decreasing value and for still higher values of Ps and vf has a value of the distribution factor df corresponding to a minimum value dfmin.

In case the control magnitude r is to be additionally processed a characteristic curve (respectively, performance graph) of the first performance graph 39 can be changed in shape, base value dfmin, slope or maximum value dfmax dependent on r.

Still further variations for the determination of the distribution factor df are mentioned in the DE-OS 36 08 059.4-12 which, of course, may also be utilized in the present invention; however, they will not be referred to in further detail.

A further meaningful input magnitude of the first functional relationship is a control value pl': a velocity vr of the wheels at the main drive axle 2 is determined by way of an average value formation 43 weighted with a constant $c_2$ from the wheel velocity signals vrl and vrr. A rotational speed difference DELTA nl results at an input and output shaft of the longitudinal clutch from a difference 44, weighted with a constant $c_3$, of the velocity of auxiliary and main drive axle vf and vr, which is combined by exponentiation, preferably squaring 45 and multiplication 46 with a factor $k_1$ to the control value p'.

The factor $k_1$ can be selected either constant or can be determined by way of a second performance graph 47 from vf and/or the steering deflection signal theta.

In the case of a constant factor $k_1$ the activation of the longitudinal clutch corresponds to a centrifugal force regulation of the rotational speed difference DELTA nl at the longitudinal clutch (clutch slippage).

If $k_1$ is determined solely from the velocity vf, then the second performance graph consists of a characteristic curve which rises with increasing value of the velocity |vf|. If additionally the steering deflection signal theta is monitored, the output magnitude $k_1$ of the second performance graph is relatively strongly reduced with increasing value of the steering deflection in order to enable a good steerability of the motor vehicle.

The input magnitude pl' thereby represents an "over rotation protection" (limitation of the clutch slippage DELTA nl) and is therefore extraordinarily meaningful and still more effective in the combination for attaining a good driving behavior than one of the methods by itself.

As further development, the first performance graph 40 can additionally be influenced by a steering deflection signal theta (with increasing steering deflection, df is relatively strongly reduced).

Function blocks 48 and 49 for the activation of a cross differential 6 of the main drive axle 2 which is continuously controllable in its locking action, and of a differential 8 of the auxiliary drive axle 3 which is continuously controllable in its locking action (function block 50) are also shown in the drawing.

The functional sequence for the determination of a locking moment control magnitude mq for the activation of the cross differential 6 and of a locking moment control magnitude mqf for the activation of the differential 8 is thereby far-reachingly identical with that for the determination of the control value pl'; however, the corresponding performance graphs and characteristic magnitudes require a different adaptation, especially also a vehicle-specific adaptation.

A rotational speed difference DELTA nq results at the output shafts of the cross differential 6, respectively, DELTA nqf at the output shafts of the differential 8 from a difference 51, respectively, 52 weighted with a constant $c_4$, respectively, $c_5$ of the wheel velocity signals vrl and vrr at the main drive axle, respectively, vfl and vfr at the auxiliary drive axle, which are combined by exponentiation, preferably square formation 53, respectively, 54 and multiplication 58, respectively, 56, with a factor $k_2$, respectively, $k_3$ into the locking moment control magnitudes mq', respectively, mqf.

The factors $k_2$, respectively, $k_3$ can thereby be selected again constant or can be determined by way of a third performance graph 57, respectively, a fourth performance graph 58 from the rotational speed difference DELTA nl at the input, respectively, at the output shaft of the longitudinal clutch and/or the desired power output Ps and/or the velocity vf of the wheels at the auxiliary drive axle and/or the steering deflection signal. The factor $k_2$, respectively, $k_3$ will thereby increase with increasing values of the rotational speed difference |DELTA nl| at the longitudinal clutch, of the desired power output Ps and of the velocity vf and will relatively strongly decrease with increasing value of the steering deflection, especially at the axle with steered wheels. The third performance graph 57 and the fourth performance graph 58 as well as the number and selection of the input magnitudes can thereby be different.

For improving the turning-in steering behavior of the motor vehicle in curve drives, it has proved as favorable to superimpose a further locking moment control magnitude mq" on the locking moment control magnitude mq' (main drive axle): a comparator 59 monitors whether the desired power output Ps is smaller than a power output value Psm lying in the middle range of the power output band available from the engine (about 50% of the maximum power output). If this is the case, then it produces a signal to a following fifth performance graph 60 which coordinates to the locking moment control magnitude mq" a value corresponding to a higher constant locking value (for example, 20% locking action). If Ps is larger than Psm, then the performance graph 60 coordinates to the further locking moment control magnitude mq" a value corresponding to a lower constant locking value (for example, 5% locking action).

A velocity-dependent characteristic can additionally be superimposed on this further locking moment control magnitude by way of the fifth performance graph, whereby in a low velocity range of vf (up to, for example, 20 km/h) the locking action can be cancelled and in a velocity range adjoining the same (up to, for example, 50 km/h), can be raised to the predetermined value dependent on power output and for still higher velocities can remain thereat.

A maximum value selection 61 finally produces the final locking moment control magnitude mq from the larger of the two values mq' and mq" for the activation of the adjusting member 13 of the differential 6.

An activation corresponding to the function block 48 can, of course, be superimposed also on the function block 50 for the activation of a lockable differential 8 at the auxiliary drive axle 3.

The constants $c_1$ to the first and the second functional relationships 36, respectively, 38 and the first to fourth performance graph are indicated only generally s they require a different adaptation to a respective vehicle type. The constants $c_1$ to $c_5$ are thereby fixed by wheel diameter and transmission ratios. The indication of an example makes therefore little sense for the selection of the functional relationships and the performance graphs which is the reason why only guide lines are indicated, by means of which the same can be matched without problem to the different vehicle types.

Figure 4:
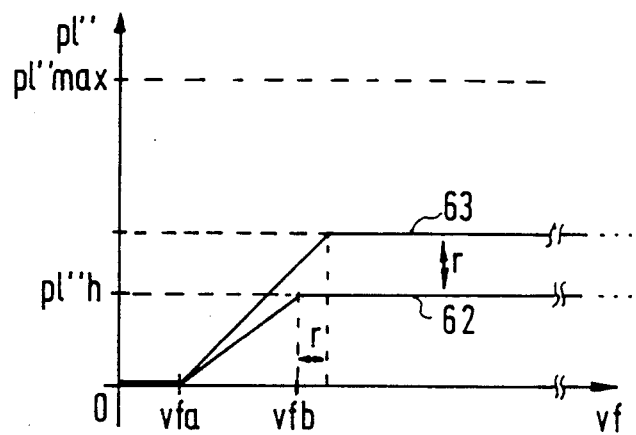
FIG. 4 is an activating magnitude-velocity diagram according to the present invention.

Only the characteristic curve performance graph 35 and the fifth performance graph 60 are to be explained more fully hereinafter. FIG. 4 illustrates the characteristic curves, 62 and 63, corresponding to the characteristic curve performance graph 35, which coordinates an activating magnitude pl" each to a vehicle velocity vf. The characteristic curves are thereby selected by way of the adjusting magnitude r and correspond, for example, to a driving program selectable by the driver for dry road, 62, and for wet road, 63; the velocity ranges are dependent therefrom in which the individual sections of the curves are effective, as also the magnitude of the actuating values. The values for vfa may be, for example, at 20 km/h, for pl"h approximately at 30%, respectively, 50% at full activation (pl"max).

Figure 5:
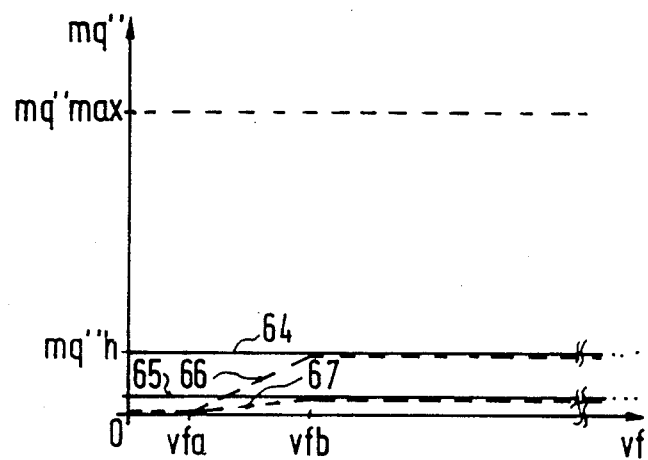
FIG. 5 is a control magnitude value-velocity diagram in accordance with the present invention.

In FIG. 5, characteristic curves 64, 65, respectively, 66, 67 (dash) corresponding to the fifth performance graph 60 are illustrated. The characteristic curves are thereby selected dependent on the desired power output Ps, respectively, on exceeding the power output threshold Psm (for example, at 50% maximum power output). If Ps is smaller than Psm, then the characteristic curve 64 (respectively, 66) is active, otherwise the characteristic curve 65 (respectively, 67); in particular, stresses in the differential at high engine power outputs are avoided thereby. The curves shown in dash lines are valid with an additional velocity-dependent characteristic curve. Values for vfa, vfb, mq"n and mq"h may be, for example, 20 km/h (vfa), 50 km/h (vfb), 20% mq"max (mq"h) and 5% mq"max (mq"n).

The arrangement is also suitable, of course, for an activation of a controllable distribution transmission, respectively, of an intermediate axle differential controllable continuously in its locking action and having the control value pl.

The value of the desired tension force |Fzs|, the distribution factor df, the actuating values pl" and mq", the first, second and third factor $k_1$, $k_2$ and $k_3$ as well as the driving resistance power Pv are determined customarily from the driving velocity. However, as slippage should occur more rarely at the auxiliary drive axle than at the main drive axle, the driving velocity may be set equal to the velocity of the wheels at the auxiliary driving axle. However, this does not preclude that the driving velocity can also be determined in some other way, for example, by contactlessly measuring sensors or by average value formation by way of the velocities of all the wheels. The value can also be monitored for plausibility in the course of the computer process and in the case of non-plausible values may also be estimated or corrected.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An arrangement for the control of the power transmission onto the axles of a four-wheel drive motor vehicle, comprising a main driving axle provided with a cross differential means, an auxiliary drive axle driven by way of a longitudinal clutch means to transfer driving power from the cross differential means of the main drive axle to the auxiliary drive axle, which clutch means is continuously controllable by an adjusting means, control means receiving input signals at least from transmitter means which detect the velocities of the wheels at the auxiliary drive axle, the control means being operable to produce a control actuation signal for the adjusting means to actuate the longitudinal clutch means to transfer power in a manner that is in a functional relationship, with at least the driving velocity determined from the velocity of the wheels at the auxiliary drive axle such that in a first low velocity range, the activation signal causes no power transfer and in a second higher velocity range the activation signal causes a power transfer that increases with increasing velocity starting from substantially zero to a controlled magnitude value and above the second velocity range the activation signal maintains the power transfer at this control magnitude value.

2. An arrangement according to claim 1, wherein the control means includes a microprocessor.

3. An arrangement according to claim 1, wherein the control magnitude value and the velocity ranges are varied in the control means by an adjusting unit.

4. An arrangement according to claim 3, wherein the control means receives further input signals from transmitter means which detect at least one of the velocities of the wheels at the main drive axle an internal combustion engine rotational speed, a drive pedal position, a throttle valve angle, a charging pressure, a charging air temperature, a steering angle to produce a control actuation signal for the adjusting means of the longitudinal clutch means that is a function of at least one further activating input that corresponds to an exponentiation of the rotational speed difference of the input and output shaft of the longitudinal clutch means.

5. An arrangement according to claim 4, wherein the control means is operable to actuate the adjusting means of the longitudinal clutch means as a function of a traction force at the auxiliary drive axle, the traction force of the wheels at the auxiliary drive axle being determined by a multiplicative linking of a value of a desired traction force of all wheels determined from a desired power output and a driving velocity with a distribution factor determined from the value of the desired traction force obtained from at least one of the input signals by way of a first performance graph means, and wherein the distribution factor is determined from the difference of the value of the desired traction force and a driving resistance derived by way of a driving resistance characteristic curve from the driving velocity.

6. An arrangement according to claim 4, wherein the function of the further activating input consists of one of a maximum value and a weighted addition from its influencing input.

7. An arrangement according to claim 5, wherein at least one lockable differential means of at least one axle of a motor vehicle is controllable continuously in its locking action by way of at least one adjusting means activated by the control means as a function of the power output of a driving internal combustion engine and the control means acting upon the last-mentioned adjusting means up to a power output value lying in the middle range of the power output band available from the internal combustion engine with a first control magnitude corresponding to a higher locking value and above this power output value with a second control magnitude corresponding to a lower locking value.

8. An arrangement according to claim 7, wherein vehicle velocity is used as a further controlling parameter and wherein the control means is operable to cancel the locking action in a first low velocity range and in a second higher velocity range to raise the control magnitude starting from zero with increasing velocity to the control magnitude corresponding to the locking value predetermined as a function of power output.

9. An arrangement according to claim 8, wherein a further control is superimposed on the activating control which depends on a function of the rotational speed difference at the output shafts of the differential means.

10. An arrangement according to claim 9, wherein the further control depends additionally from a function of any one of the power output and rotational speed difference between the wheels of two axles of the motor vehicle and a steering angle.

11. An arrangement according to claim 10, wherein the function of the rotational speed difference corresponds to an exponentiation of the rotational speed difference at the output shafts of the differential means.

12. An arrangement according to claim 11, wherein the function of the rotational speed difference corresponds to the squaring of the rotational speed difference at the output shafts of the differential means.

13. An arrangement according to claim 11, wherein the adjusting means is activated in each case with the larger value of the two control magnitudes.

14. An arrangement according to claim 1, wherein the control means receives further input signals from transmitter means which detect at least one of the velocities of the wheels at the main drive axle, an internal combustion engine rotational speed, a drive pedal position, a throttle valve angle, a charging pressure, a charging air temperature, a steering angle to produce a control actuation signal for the adjusting means of the longitudinal clutch means that is a function of at least one further activating input that corresponds to an exponentiation of the rotational speed difference of the input and output shaft of the longitudinal clutch means.

15. An arrangement according to claim 1, wherein the control means is operable to actuate the adjusting means of the longitudinal clutch means as a function of a traction force at the auxiliary drive axle, the traction force of the wheels at the auxiliary drive axle being determined by a multiplicative linking of a value of a desired traction force of all wheels determined from a desire power output and a driving velocity with a distribution factor determined from the value of the desired traction force obtained from at least one of the input signals by way of a first performance graph means, and wherein the distribution factor is determined from the difference of the value of the desired traction force and a driving resistance derived by way of a driving resistance characteristic curve from the driving velocity.

16. An arrangement according to claim 1, wherein the function of the further activating input consists of one of a maximum value and a weighted addition from its influencing input.

17. An arrangement according to claim 1, wherein at least one lockable differential means of at least one axle of a motor vehicle is controllable continuously in its locking action by way of at least one adjusting means activated by the control means as a function of the power output of a driving internal combustion engine and the control means acting upon the last-mentioned adjusting means up to a power output value lying in the middle range of the power output band available from the internal combustion engine with a first control magnitude corresponding to a higher locking value and above this power output value with a second control magnitude corresponding to a lower locking value.

18. An arrangement according to claim 17, wherein vehicle velocity is used as a further controlling parameter and wherein the control means is operable to cancel the locking action in a first low velocity range and in a second higher velocity range to raise the control magnitude starting from zero with increasing velocity to the control magnitude corresponding to the locking value predetermined as a function of power output.

19. An arrangement according to claim 17, wherein a further control is superimposed on the activating control which depends on a function of the rotational speed difference at the output shafts of the differential means.

20. An arrangement according to claim 19, wherein the further control depends additionally from a function of any one of the power output and rotational speed difference between the wheels of two axles of the motor vehicle and a steering angle.

21. An arrangement according to claim 20, wherein the function of the rotational speed difference corresponds to an exponentiation of the rotational speed difference at the output shafts of the differential means.

22. An arrangement according to claim 21, wherein the adjusting means is activated in each case with the larger value of the two control magnitudes.

* * * * *